United States Patent [19]

Payne et al.

[11] Patent Number: 4,852,288
[45] Date of Patent: Aug. 1, 1989

[54] ARTICULATED WILD GAME DECOY

[76] Inventors: H. Dwaine Payne, 2602 Cypress Circle, Bryan, Tex. 77803; Terry C. Brunner, Sr., P.O. Box 159, Oakwood, Tex. 77855

[21] Appl. No.: 254,850

[22] Filed: Oct. 7, 1988

[51] Int. Cl.$^4$ .............................................. A01M 31/06
[52] U.S. Cl. .......................................................... 43/2
[58] Field of Search ...................................... 43/2, 1, 3

[56] References Cited

U.S. PATENT DOCUMENTS

| | | | |
|---|---|---|---|
| 311,877 | 2/1885 | Danz | 43/3 |
| 3,119,650 | 1/1964 | Bilyeu | 43/2 |
| 3,350,808 | 11/1967 | Mitchell | 43/3 |
| 3,401,476 | 9/1968 | Trumbo | 43/3 |
| 3,927,485 | 12/1975 | Thorsnes | 43/3 |
| 4,773,178 | 9/1988 | Marer | 43/1 |

*Primary Examiner*—Gene P. Crosby
*Attorney, Agent, or Firm*—Neal J. Mosely

[57] ABSTRACT

An articulated game decoy activated by wind is formed of sheet material and has a main body member adapted to be mounted on trees or shrubs, a head and neck member pivotally connected to the main body, elastic members connected between the head and neck member and main body member, and ears attached transverse to the head portion of the head and neck member to catch the wind and oscillate the head and neck member relative to the main body when subjected to a breeze. The main body may have an integral tail portion, or have a separate tail member pivotally connected thereto with elastic members therebetween which will also oscillate when subjected to a breeze. The sheet material may have a weather resistive wax coating and the main body may be provided with a scent impregnated wax coating, or with a recess or aperture to receive a scented insert to attract wild game.

28 Claims, 1 Drawing Sheet

ARTICULATED WILD GAME DECOY

BACKGROUND OF THE INVENTION

1. Field of the Invention

This invention relates generally to decoys for photographers or hunters, and more particularly to an articulated wild game decoy having a head and neck member which oscillates relative to the main body when subjected to a breeze.

2. Brief Description of The Prior Art

Wild game decoys having no moving parts are widely used by hunters, but are somewhat unsatisfactory because they are rigid and do not give the appearance of movement. Mechanized decoys with moving parts are complex structures and are often unreliable and/or difficult to operate from a remote distance. Wind activated decoys and scented decoys are known in the art. There are several patents which disclose various decoys.

Sievers U.S. Pat. No. 586,145 discloses a hollow fabric animal decoy adapted to be supported and operated by inclosed hunters and for whom the decoy forms a concealing shell or blind.

Vos, U.S. Pat. No. 2,237,897 discloses a foldable cutout sheet of material for use as a toy or display. The cutout can be in the shape of an animal.

Bilyeu, U.S. Pat. 3,119,650 discloses a small catalytic warmer device for heating and propagating a scent for attracting wild game. The device is readily carried on the person or supported unobtrusively in the woods. The receptacle containing the scent has an outer wall shaped like a deer head and is attached to the warmer to dispense the scent.

Myers, U.S. Pat. No. 3,163,418 discloses a motionless stuffed, three dimensional animal archery target mounted on legs which fit into the ground.

Tryon, U.S. Pat. No. 3,707,798 discloses a motionless sheet material decoy of a goose. The sheet material bears a photo reproduction of an actual goose.

Mitchell, U.S. Pat. No. 3,350,808 discloses a goose decoy of sheet material having a head which is movable by a small battery powered electric windshield wiper motor.

Thorsnes, U.S. Pat. No. 3,927,485 discloses a floating three dimensional water fowl decoy having a movable head which is manually moved by a line connected to a pulley on the bottom of a pond or other body of water.

Littleton et al, U.S. Pat. No. 3,052,054 discloses a motionless hunter's blind of sheet material bearing a reproduction of an animal.

The present invention is distinguished over the prior art in general, and these patents in particular by a wind activated articulated game decoy formed of sheet material and having a main body member adapted to be mounted on trees or shrubs, a head and neck member pivotally connected to the main body, elastic members connected between the head and neck member and main body member, and ears attached transverse to the head portion of the head and neck member to catch the wind and oscillate the head and neck member relative to the main body when subjected to a breeze. The main body may have an integral tail portion, or have a separate tail member pivotally connected thereto with elastic members therebetween which will also oscillate when subjected to a breeze. The sheet material may have a weather resistive wax coating and the main body may be provided with a scent impregnated wax coating, or with a recess or aperture to receive a scented insert to attract wild game.

SUMMARY OF THE INVENTION

It is therefore an object of the present invention to provide an articulated wild game decoy which has realistic head and neck movement, is lightweight and readily portable, and easily attached to trees and shrubs in the woods.

It is another object of this invention to provide an articulated wild game decoy which is activated by slight breeze to simulate lifelike movement.

Another object of this invention is to provide an articulated wild game decoy which is constructed of a small number of simple and easily assembled components.

Another object of this invention is to provide an articulated wild game decoy which is adapted to propagate into the atmosphere a scent that is capable of attracting the wild game being hunted.

A further object of this invention is to provide an articulated wild game decoy of inexpensive lightweight materials having a weather resistant wax coating.

A still further object of this invention is to provide an articulated wild game decoy which is simple in construction, inexpensive to manufacture, and rugged and durable in use.

Other objects of the invention will become apparent from time to time throughout the specification and claims as hereinafter related.

The above noted objects and other objects of the invention are accomplished by a wind activated articulated game decoy which formed of sheet material and has a main body member adapted to be mounted on trees or shrubs, a head and neck member pivotally connected to the main body, elastic members connected between the head and neck member and main body member, and ears attached transverse to the head portion of the head and neck member to catch the wind and oscillate the head and neck member relative to the main body when subjected to a breeze. The main body may have an integral tail portion, or have a separate tail member pivotally connected thereto with elastic members therebetween which will also oscillate when subjected to a breeze. The sheet material may have a weather resistive wax coating and the main body may be provided with a scent impregnated wax coating, or with an aperture or recess to receive a scented insert to attract wild game.

DESCRIPTION OF THE PREFERRED EMBODIMENT

Figure 1:
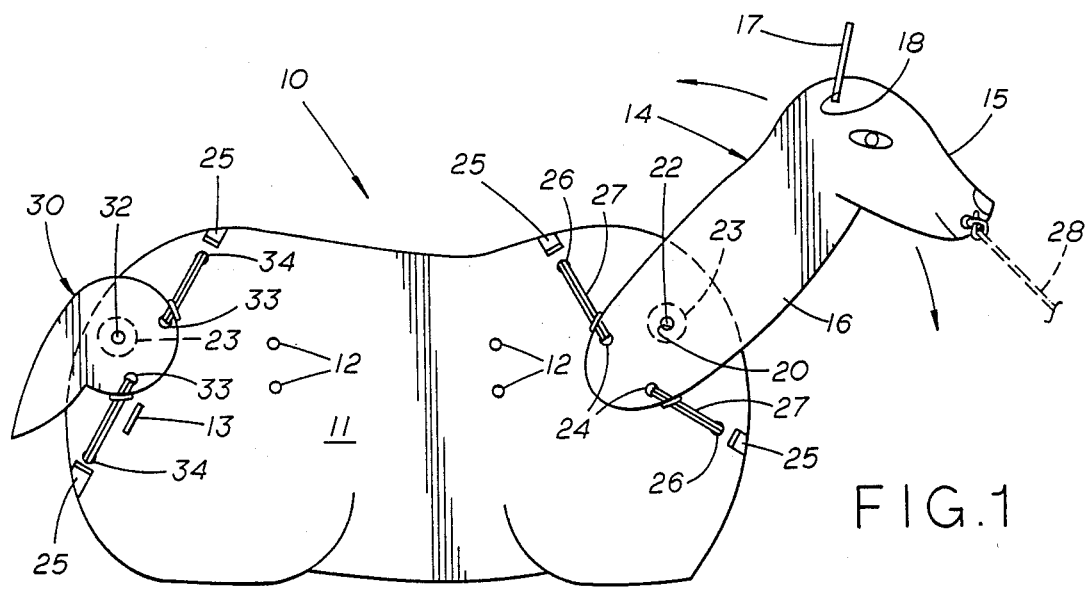
FIG. 1 is a front elevation of an articulated decoy in accordance with the present invention.
Figure 2:
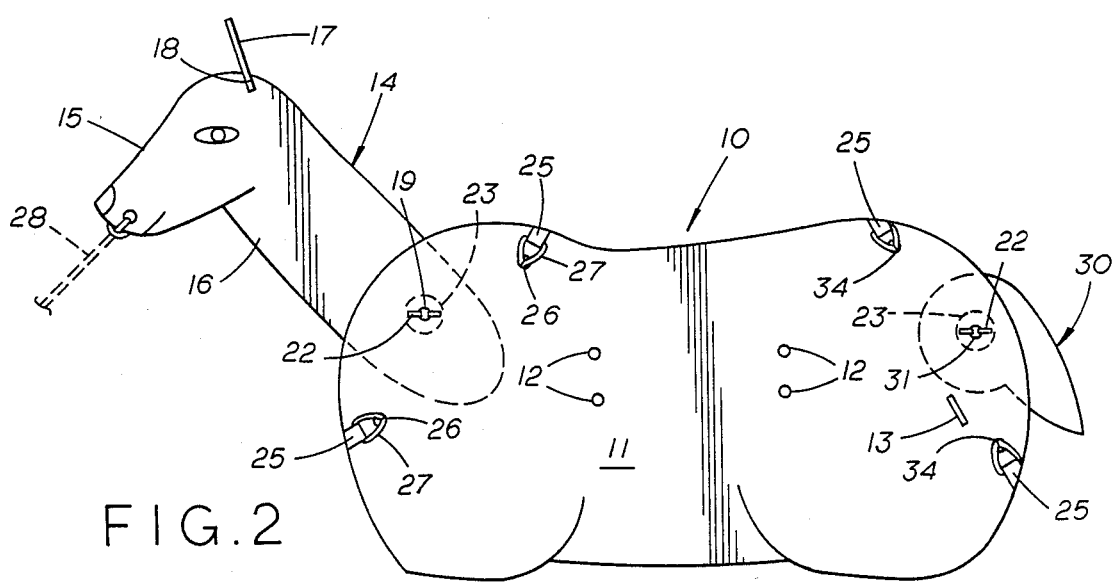
FIG. 2 is a rear elevation view of the articulated decoy of FIG. 1.
Figure 3:
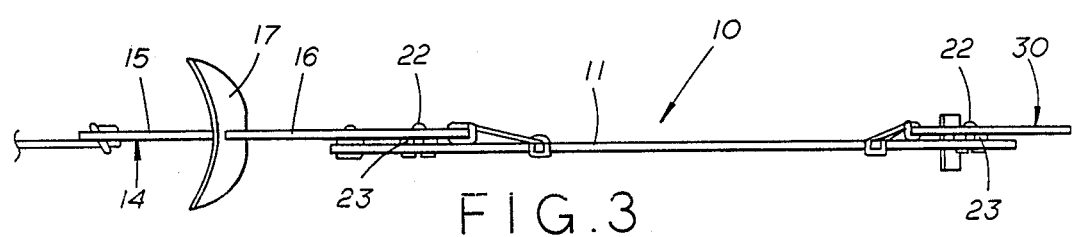
FIG. 3 is a top plan view of the articulated decoy.

Referring to the drawings by numerals of reference, there is shown in FIGS. 1, 2, and 3, a preferred articulated decoy 10. The decoy 10 comprises a trunk or main body 11 preferably made of cardboard, fiberboard, sheet plastic or other suitable lightweight sheet material cut to resemble the profile of the body of a deer or other wild game animal without the legs. The size of the main body being approximately the same size as the real game animal. A plurality of holes 12 are formed through the main body 11 for securing it to a tree or shrub a distance above the ground, such as tying it with a string or rope.

The main body 11 is painted or otherwise colored or ornamented to resemble the natural coloring of the game being sought. The cardboard or other material used for the main body 11 may be coated with wax impregnated with a chemical scent to attract the wild game and to withstand the exposure weather. Alternatively, a recess, slot or aperture 13 may be formed in the main body 11, preferably near the tail portion, to receive a stick, bar, or block of animal scent, or a cloth or piece of cotton soaked with the scent.

The neck and head member 14 is a unit separate from the main body 11 also formed of cardboard or other suitable lightweight sheet material cut to resemble the profile and size of the head 15 and neck 16 of the deer or other animal and is correspondingly colored and ornamented.

Figure 4:
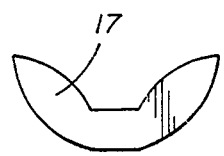
FIG. 4 is a front elevation of the ear member of the articulated decoy.
Figure 5:
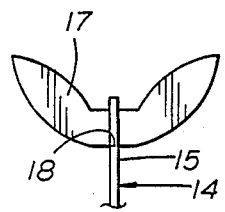
FIG. 5 is a partial side elevation of the head portion of the decoy having the ear member installed thereon.

The ear unit 17 (FIG. 4) is also separate from the main body 11 and head and neck member 14 and formed of cardboard or other suitable lightweight sheet material cut to resemble the shape of the ears of deer or other animal viewed from the front, and is correspondingly colored and ornamented. A slot 18 is formed in the top of the head portion 15 to slidably receive and frictionally retain the ear unit in a transverse or crosswise relation to the head with the ears extending laterally outward from each side as seen in FIG. 5.

Figure 6:
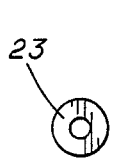
FIG. 6 is an elevation view of a spacer member of the articulated decoy.

Main body 11 has a hole 19 at one end above the shoulder area and the lower end of the neck member 16 has a hole 20. The head and neck member 14 is pivotally connected to the main body 11 by overlapping the two components with the holes 19 and 20 aligned and connecting them with a brad, stud or other suitable fastener 22 through the holes. A disc-shaped spacer 23 (FIG. 6) having a central hole may be interposed between the overlapped components at assembly to reduce friction between the parts 11 and 15 and to facilitate relative movement between the pieces. The head and neck member 15 thus is free to pivot about the fastener 22 relative to the main body 11. The spacer 23 may also be coated with wax or formed of low friction material.

Figure 7:
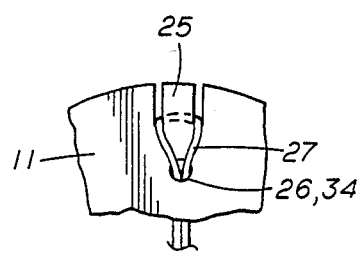
FIG. 7 is a partial elevation of the main body portion of the articulated decoy showing an elastic member connected to a tab formed thereon.

The lower end of the neck portion 16 has a pair of holes 24 (FIG. 2) radially outward from, and below, the pivot point (fastener 22) near opposing outer edges. As best seen in FIG. 7, the main body member 11 has a pair of parallel slots radially spaced from the hole 19 extending inward a distance from two peripheral edges of the main body 11 to form inverted U-shaped tabs 25. The main body has a hole 26 a short distance inward from each tab 25.

A rubber or elastic band 27 is inserted in each hole 24 in the neck portion 16 and looped through itself. The free ends of the rubber or elastic bands 27 are inserted through the holes 26 in the main body 11 and the end loop is placed over the inverted U-shaped tabs 25. In this manner, the head and neck member 14 is resiliently connected to the main body 11 such that it can pivotally oscillate relative to the main body.

The main body 11 may have an integral tail portion, or have a separate tail member pivotally connected thereto which will also oscillate when subjected to a breeze. In the movable tail modification, a tail member 30 is provided separate from the main body 11 which is also formed of cardboard or other suitable lightweight sheet material cut to resemble the profile and size of the head 15 and neck 16 of the tail of the deer or other animal and is correspondingly colored and ornamented.

The main body 11 has a hole 31 at the rear end and the upper portion of the tail member 30 has a hole 32. The tail member 30 is pivotally connected to the main body 11 by overlapping the two components with the holes 31 and 32 aligned and connecting them with a brad or other suitable fastener 22 through the holes. A disc-shaped spacer 23 (FIG. 6) having a central hole may be interposed between the overlapped components at assembly to reduce friction between the parts 11 and 30 and to facilitate relative movement between the pieces. The tail member 30 thus is free to pivot about the fastener 22 relative to the main body 11. The spacer 23 may also be coated with wax or formed of low friction material.

The upper end of the tail member 30 has a pair of holes 33 (FIG. 2) radially outward from the pivot point (fastener 22) near the outer periphery. The main body member 11 has a pair of parallel slots (FIG. 7) radially spaced from the hole 31 extending inward a distance from two peripheral edges thereof to form inverted U-shaped tabs 25. The main body 11 has a hole 34 located a short distance inward from each tab 25. A rubber or elastic band 27 is inserted in each hole 33 in the tail member 30 and looped through itself. The free ends of the rubber or elastic bands 27 are inserted through the holes 34 in the main body 11 and the end loop is placed over the inverted U-shaped tabs 25.

In the modification, the tail member 30 will also pivotally oscillate relative to the main body. While one method of resiliently connecting the head and neck member and tail member to the main body has been described, it should be understood that other methods may be used such as stapling or clipping an elastic strip between the pieces, or connecting an elastic cord having hooks at each end through holes in each piece.

OPERATION

In operation, the head and neck member 14 (and optional tail member) of the decoy 10 is connected to the main body 11 as outlined above, and the ear unit 17 is inserted into the slot 18 in the top of the head portion 15 to be frictionally retained in a crosswise relation to the head with the ears extending laterally outward from each side. The outwardly extending ears will catch the wind. The main body is secured to a tree trunk or shrub a distance above the ground by tying it through the holes 12 with a suitable string or rope. If tied to a shrub, the main body will move as the shrub moves when subjected to a sufficient breeze. If the main body is not coated with a scent impregnated wax, then a stick, bar, or block of animal scent, or a cloth or piece of cotton soaked with a scent is inserted into the aperture 13 near the tail portion to attract wild game.

Because the head and neck member 14 (and tail member 30) is resiliently connected to the main body 11, the head and neck member (and tail member) will pivotally oscillate relative to the main body when the ears are subjected to a breeze. The head and neck member (and tail member) will also oscillate if the main body is connected to a shrub due to the movement of the shrub in the breeze.

Oscillating head and neck, and tail, motion thus gives the decoy the appearance of realistic lifelike animal movements while the scent attracts the wild game. It should be understood that a string 28 may also be attached to the head member 15 (or tail member 30) for manual manipulation remote from the decoy when there is no breeze.

While this invention has been described fully and completely with special emphasis upon a preferred embodiment, it should be understood that within the scope of the appended claims the invention may be practiced otherwise than as specifically described herein.

We claim:

1. An articulated wild game decoy activated by wind comprising;
   a main body member formed of sheet material having the profile of the body of a deer or other wild game animal without the legs,
   means on said main body member for mounting on trees, shrubs and other objects above the ground surface,
   a head and neck member separate from said main body member formed of sheet material having the profile of the head and neck of said deer or other animal and pivotally connected to said main body member for pivotal movement relative thereto,
   an ear member separate from said main body member and said head and neck member formed of sheet material having the shape of the ears of said deer or other animal viewed from the front and slidably received on said head and neck member and frictionally retained thereon in a transverse relation thereto with the ears extending laterally outward from each side thereof to catch the wind, and
   resilient means operatively connected between said main body member and said head and neck member and cooperative with said pivotal connection to oscillate said head and neck member about the pivotal connection relative to said main body when subjected to a breeze.

2. An articulated wild game decoy according to claim 1 in which
   said sheet material is cardboard, fiberboard, or sheet plastic.

3. An articulated wild game decoy according to claim 1 including
   chemical scent means on said main body for attracting wild game.

4. An articulated wild game decoy according to claim 1 in which
   said sheet material has a weather resistive wax coating.

5. An articulated wild game decoy according to claim 4 in which
   said wax coating is impregnated with a chemical scent to attract wild game.

6. An articulated wild game decoy according to claim 1 in which
   said main body member, said head and neck member, and said ear members are colored or ornamented to resemble the natural coloring of the game being sought.

7. An articulated wild game decoy according to claim 1 in which
   said sheet material is cardboard, fiberboard, or sheet plastic having a weather resistive wax coating impregnated with a chemical scent to attract wild game, and
   said main body member, said head and neck member, and said ear members are colored or ornamented to resemble the natural coloring of the game being sought.

8. An articulated wild game decoy according to claim 1 in which
   said main body mounting means comprises a plurality of holes through said main body for receiving string or rope.

9. An articulated wild game decoy according to claim 1 including
   a slot for a scented member removably secured therein to attract wild game.

10. An articulated wild game decoy according to claim 1 in which
    said main body member has a hole at one end thereof,
    the lower end of the head and neck member has a hole, and
    fastener means extending through said holes to movably join said head and neck member and said main body member together in overlapped relation with said holes aligned and forming the pivotal connection between said main body member and said head and neck member.

11. An articulated wild game decoy according to claim 10 including
    a disc-shaped spacer member having a central hole interposed between said overlapped portions and retained therebetween by said fastener means to reduce friction and facilitate relative movement between the moving parts.

12. An articulated wild game decoy according to claim 11 in which
    said disc-shaped spacer member has a wax coating.

13. An articulated wild game decoy according to claim 11 in which
    said disc-shaped spacer member is made of cardboard.

14. An articulated wild game decoy according to claim 1 in which
    said resilient means comprises a least one elastic member secured between said head and neck member and said main body member.

15. An articulated wild game decoy according to claim 14 in which
    said head and neck member has at least one hole in the lower end thereof positioned radially outward from, and below, the pivotal connection,
    said main body member has a pair of tabs formed thereon, and
    said elastic member has one end secured to said head and neck member and its opposite end secured to said main body member such that said head and neck member is resiliently connected to said main body member to pivotally oscillate relative thereto.

16. An articulated wild game decoy according to claim 1 including
    a string attached at one end to said head and neck member for manual manipulation thereof remote from the decoy.

17. An articulated wild game decoy according to claim 1 including a tail member separate from said main body member formed of sheet material having the profile of the tail of said deer or other animal and pivotally connected to said main body member for pivotal movement relative thereto, and resilient means operatively connected between said main body member and said tail member and cooperative with said pivotal connection to oscillate said tail member about the pivotal connection relative to said main body when subjected to a breeze.

18. An articulated wild game decoy according to claim 17 in which said tail member has a weather resistive wax coating.

19. An articulated wild game decoy according to claim 18 in which said wax coating is impregnated with a chemical scent to attract wild game.

20. An articulated wild game decoy according to claim 17 in which said tail member is colored or ornamented to resemble the natural coloring of the game being sought.

21. An articulated wild game decoy according to claim 17 in which the pivotal connection between said main body member and said tail member comprises;

a hole through said main body member at one end thereof, a hole through the upper end of the tail member, and fastener means extending through said holes to movably join said tail member and said main body member together in overlapped relation with said holes in axial alignment.

22. An articulated wild game decoy according to claim 21 including a disc-shaped spacer member having a central hole interposed between said overlapped portions and retained therebetween by said fastener means to reduce friction and facilitate relative movement between the moving parts.

23. An articulated wild game decoy according to claim 22 in which said disc-shaped spacer member has a wax coating.

24. An articulated wild game decoy according to claim 23 in which said disc-shaped spacer member is made of cardboard.

25. An articulated wild game decoy according to claim 17 in which said resilient means comprises a least one elastic member secured between said head and neck member and said main body member.

26. An articulated wild game decoy according to claim 25 in which said tail member has at least one hole in the lower end thereof positioned radially outward from its pivotal connection, said main body member has a pair of tabs formed thereon, and said elastic member has one end secured to said tail member and its opposite end secured to said main body member such that said tail member is resiliently connected to said main body member to pivotally oscillate relative thereto.

27. An articulated wild game decoy according to claim 16 including a tail member, a string attached at one end to said tail member for manual manipulation thereof remote from the decoy.

28. An articulated wild game decoy according to claim 1 in which said sheet material is cardboard, fiberboard, or sheet plastic having a weather resistive wax coating impregnated with a chemical scent to attract wild game, and said main body member, said head and neck member, and said ear members are colored or ornamented to resemble the natural coloring of the game being sought, said main body member has a hole at one end thereof, the lower end of the head and neck member has a hole, fastener means extending through said holes to movably join said head and neck member and said main body member together in overlapped relation with said holes aligned and forming the pivotal connection between said main body member and said head and neck member, a disc-shaped spacer member having a central hole interposed between said overlapped portions and retained therebetween by said fastener means to reduce friction and facilitate relative movement between the moving parts, and said resilient means comprises a least one elastic member secured between said head and neck member and said main body member to cause said head and neck member to pivot on said main body member.

* * * * *